(12) United States Patent
Otani et al.

(10) Patent No.: US 11,090,946 B2
(45) Date of Patent: Aug. 17, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Ryosuke Otani, Tokyo (JP); Hisashi Ishikawa, Urayasu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/683,567

(22) Filed: Nov. 14, 2019

(65) Prior Publication Data

US 2020/0156386 A1 May 21, 2020

(30) Foreign Application Priority Data

Nov. 15, 2018 (JP) .............................. JP2018-214958

(51) Int. Cl.
*B41J 2/21* (2006.01)
*B41J 2/20* (2006.01)
*B41J 2/205* (2006.01)

(52) U.S. Cl.
CPC ........... *B41J 2/2139* (2013.01); *B41J 2/2054* (2013.01)

(58) Field of Classification Search
CPC .......................... B41J 2/2139; B41J 2/2054
See application file for complete search history.

(56) References Cited

U.S. PATENT DOCUMENTS

| | | | |
|---|---|---|---|
| 9,462,091 | B2 | 10/2016 | Hara et al. |
| 9,485,388 | B2 | 11/2016 | Kodama et al. |
| 9,690,228 | B2 | 6/2017 | Otani |
| 9,734,439 | B2 | 8/2017 | Hara et al. |
| 9,749,496 | B2 | 8/2017 | Fujimoto et al. |
| 10,027,848 | B2 | 7/2018 | Fuse et al. |
| 10,043,118 | B2 | 8/2018 | Sumi et al. |
| 10,057,459 | B2 | 8/2018 | Yamamoto et al. |
| 10,063,743 | B2 | 8/2018 | Fuse et al. |
| 10,073,370 | B2 | 9/2018 | Takikawa et al. |
| 10,187,553 | B2 | 1/2019 | Takesue et al. |
| 10,194,053 | B2 | 1/2019 | Otani et al. |
| 10,356,282 | B2 | 7/2019 | Ochiai et al. |

(Continued)

FOREIGN PATENT DOCUMENTS

| | | |
|---|---|---|
| JP | H0441243 A | 2/1992 |
| JP | 2006130904 A | 5/2006 |

*Primary Examiner* — Jason S Uhlenhake
(74) *Attorney, Agent, or Firm* — Carter, DeLuca & Farrell LLP

(57) ABSTRACT

Density unevenness accompanying a variation in an ejection characteristic of each nozzle is reduced without worsening granularity of an image. To this end, an image processing apparatus generates first corrected data by correcting image data by using a first correction table common to the plurality of nozzles. Further, the image processing apparatus generates second corrected data by correcting the image data by using a second correction table for each of the plurality of nozzles. Furthermore, the image processing apparatus generates first quantized data by quantizing the first corrected data and generates second quantized data by quantizing the second corrected data. After that, the image processing apparatus generates N-valued print data based on the first quantized data and the second quantized data.

20 Claims, 11 Drawing Sheets

(56) References Cited

U.S. PATENT DOCUMENTS

| | | | |
|---|---|---|---|
| 2006/0071954 A1* | 4/2006 | Morooka | B41J 2/17546 347/5 |
| 2012/0242725 A1* | 9/2012 | Tamura | B41J 2/17513 347/9 |
| 2016/0167415 A1* | 6/2016 | Ikeda | B41J 2/2132 347/14 |
| 2017/0139363 A1 | 5/2017 | Takikawa et al. | |
| 2019/0156164 A1 | 5/2019 | Yanai et al. | |
| 2020/0074251 A1 | 3/2020 | Takesue et al. | |
| 2020/0079102 A1 | 3/2020 | Ochiai et al. | |

* cited by examiner

IMAGE PROCESSING APPARATUS, IMAGE PROCESSING METHOD AND STORAGE MEDIUM

BACKGROUND OF THE INVENTION

Field of the Invention

The present invention relates to an image processing apparatus, an image processing method, and a storage medium, and in particular, to density unevenness correction in a print output.

Description of the Related Art

In a full line type ink jet printing apparatus, by a one-time relative scan of a print head ejecting ink and a printing medium, an image is completed on the printing medium. Further, even in a case of a serial type ink jet printing apparatus, on a condition that single-pass printing is adopted, by a one-time relative scan of a print head and a printing medium, an image of a unit image area on the printing medium is completed.

In a case where an image is completed by the one-time relative scan (hereinafter, referred to as single pass) of a print head and a printing medium such as this, there is a possibility that the ejection characteristic of each nozzle ejecting ink appears in the image. For example, one line on a printing medium, which is printed by a nozzle whose ejection amount is smaller than the average or whose ejection direction is deflected, is likely to be recognized as an area whose density is low. On the other hand, one line printed by a nozzle whose ejection amount is larger than the average is likely to be recognized as a line area whose density is high. Then, in a case where the line whose density is low and the line whose density is high exist mixedly on the same printing medium, the lines are recognized as density unevenness.

Japanese Patent Laid-Open No. H4-41243 has disclosed a correction method of correcting image data in accordance with the ejection characteristic of each nozzle as a method for reducing the density unevenness such as this.

Further, Japanese Patent Laid-Open No. 2006-130904 has disclosed a method of correcting the dot size to be formed on a printing medium to a large size in order to make it possible to obtain a desired density of a line that is printed by a nozzle whose ejection direction is deflected.

However, in a case where correction is performed for image data as in Japanese Patent Laid-Open No. H4-41243, there is a possibility that a degree of concentration of dot varies caused by quantization processing to be performed later. Specifically, fluctuations in density for each pixel in image data accompanying correction interfere with a dither matrix used in the quantization processing to bring about a variation of dot concentration, and therefore, there is a case where the variation of dot concentration is recognized as a granularity at the time of observation of the image.

In contrast to this, in Japanese Patent Laid-Open No. 2006-130904, correction of the dot size is performed after printing or non-printing of a dot is determined by the quantization processing, and therefore, the interference with a dither matrix is not brought about. However, in Japanese Patent Laid-Open No. 2006-130904, for the area whose density is increased, the number of dots is reduced because it is not possible to reduce the dot size, and therefore, the dot arrangement specified by the dither matrix is not maintained. As a result of this, there is a case where the granularity worsens.

SUMMARY OF THE INVENTION

The present invention has been made in order to solve the above-described problems. Consequently, an object thereof is to reduce the density unevenness accompanying the variation in the ejection characteristic of each nozzle without worsening the granularity of an image.

In a first aspect of the present invention, there is provided an image processing apparatus that generates N-valued (N is an integer not less than 3) print data for representing densities at N levels on a printing medium by relatively moving, with respect to a print head in which a plurality of nozzles capable of representing densities at the N levels is arrayed in a predetermined direction, the printing medium in a direction intersecting the predetermined direction, the image processing apparatus, comprising: an acquisition unit configured to acquire image data; a first correction unit configured to generate first corrected data by correcting the image data by using a first correction table common to the plurality of nozzles; a second correction unit configured to generate second corrected data by correcting the image data by using a second correction table for each of the plurality of nozzles; a first quantization unit configured to generate first quantized data by quantizing the first corrected data; a second quantization unit configured to generate second quantized data by quantizing the second corrected data; and a generation unit configured to generate the N-valued print data based on the first quantized data and the second quantized data.

In a second aspect of the present invention, there is provided an image processing method that generates N-valued (N is an integer not less than 3) print data for representing densities at N levels on a printing medium by relatively moving, with respect to a print head in which a plurality of nozzles capable of representing densities at the N levels is arrayed in a predetermined direction, the printing medium in a direction intersecting the predetermined direction, the image processing method comprising: an acquisition step of acquiring multi-valued image data for each pixel; a first correction step of generating multi-valued first corrected data by correcting the image data by using a first correction table common to the plurality of nozzles; a second correction step of generating multi-valued second corrected data by correcting the image data by using a second correction table for each of the plurality of nozzles; a first quantization step of generating first quantized data by quantizing the first corrected data; a second quantization step of generating second quantized data by quantizing the second corrected data; and a generation step of generating the N-valued print data based on the first quantized data and the second quantized data.

In a third aspect of the present invention, there is provided a non-transitory computer readable storage medium storing a program for causing a computer to function as each unit of an image processing apparatus that generates N-valued (N is an integer not less than 3) print data for representing densities at N levels on a printing medium by relatively moving, with respect to a print head in which a plurality of nozzles capable of representing densities at the N levels is arrayed in a predetermined direction, the printing medium in a direction intersecting the predetermined direction, the image processing apparatus, comprising: an acquisition unit configured to acquire image data; a first correction unit configured to generate first corrected data by correcting the image data by using a first correction table common to the plurality of nozzles; a second correction unit configured to generate second corrected data by correcting the image data by using a second correction table for each of the plurality of nozzles; a first quantization unit configured to generate first quantized data by quantizing the first corrected data; a second quantization unit configured to generate binary second quantized data having a value of 1 or 0 by quantizing the second corrected data; and a generation unit configured to generate, for a pixel whose value is 1 in the second quantized data, the N-valued print data by correcting a value of the pixel in the first quantized data to a value one value larger.

Further features of the present invention will become apparent from the following description of exemplary embodiments with reference to the attached drawings.

DESCRIPTION OF THE EMBODIMENTS

In the following, with reference to the attached drawings, preferred embodiments of the present invention are explained. Configurations shown in the following embodiments are merely exemplary and the present invention is not necessarily limited to the configurations shown schematically.

First Embodiment

Figure 1A:
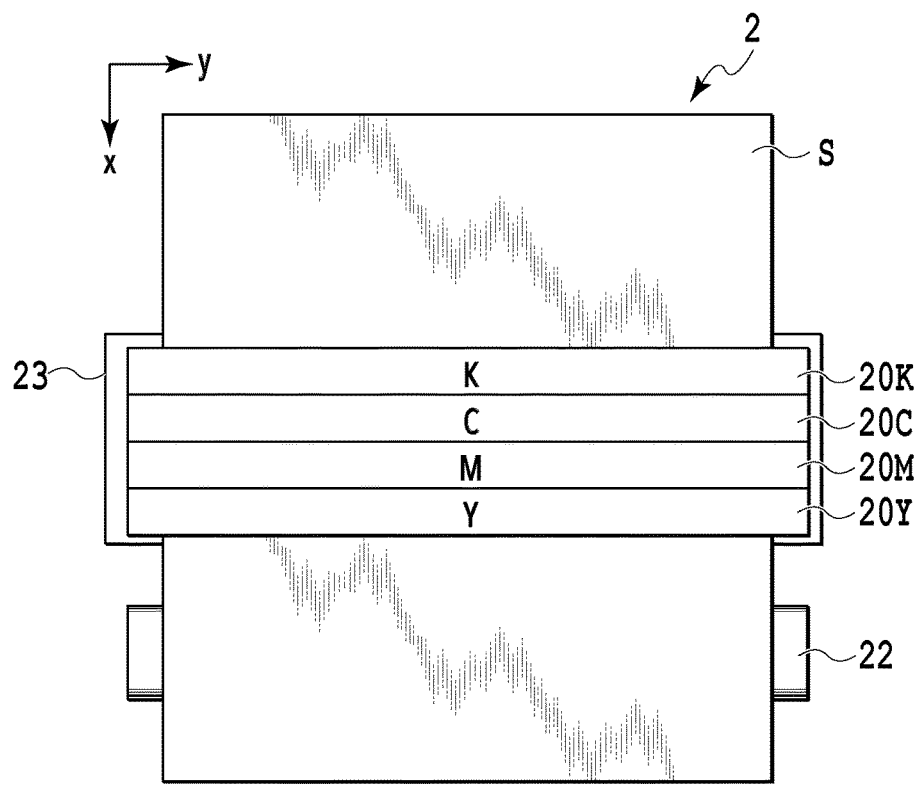
FIGS. 1A and 1B are outline configuration diagrams of an ink jet printing apparatus and a print head.
Figure 1B:
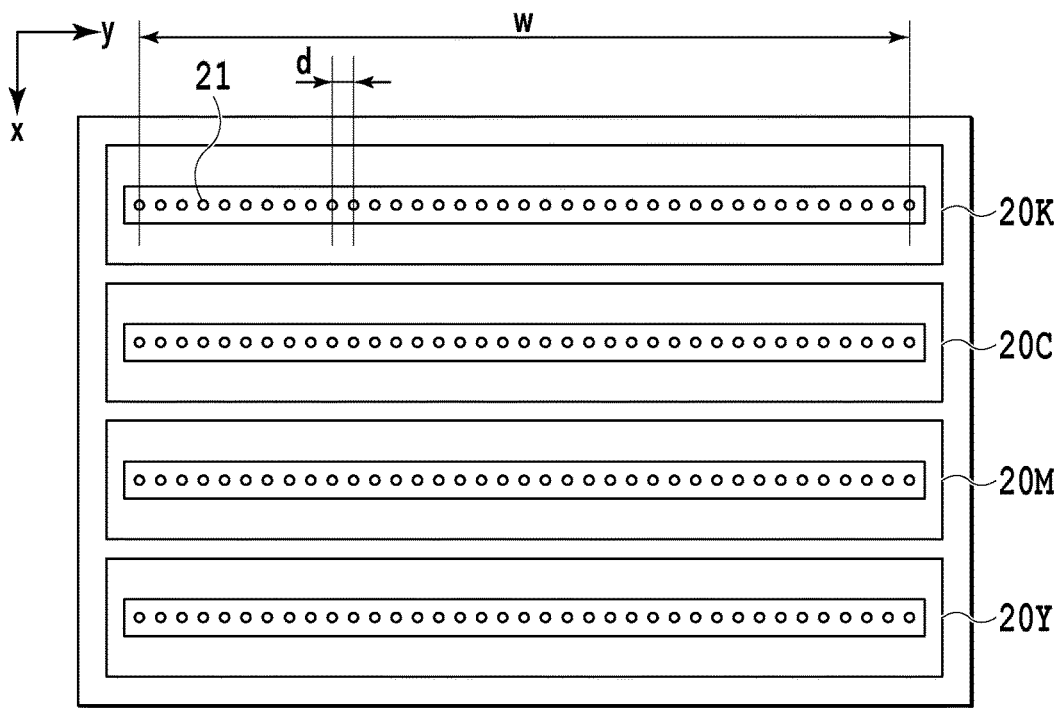

FIGS. 1A and 1B are outline configuration diagrams of an ink jet printing apparatus 2 (hereinafter, also referred to simply as printing apparatus) that is used in the present embodiment. As shown in FIG. 1A, the ink jet printing apparatus 2 mounts a print head in which nozzle rows 20K, 20C, 20M, and 20Y each ejecting black (K), cyan (C), magenta (M), and yellow (Y) inks respectively are arranged.

A conveyance roller 22 conveys a printing medium S in an x-direction at a predetermined speed. A platen 23 configured by a flat plate faces the ejection port surfaces of the nozzle rows 20K, 20C, 20M, and 20Y and supports the printing medium S that is conveyed from the rear side. The smoothness of the printing medium S in an area supported by the platen 23 is maintained and the distance from the ejection port surface is kept constant.

As shown in FIG. 1B, in each of the nozzle rows 20K, 20C, 20M, and 20Y, a plurality of nozzles 21 ejecting ink as droplets is arrayed in a y-direction at intervals of a pitch d so as to cover a distance W corresponding to the width of the printing medium S. Further, the four rows of the nozzle rows 20K, 20C, 20M, and 20Y are arranged in parallel in the x-direction.

In each nozzle 21, a piezo element is arranged and by changing the pulse shape of the voltages that is applied to the piezo element, it is possible to adjust the amount of droplet to be ejected at (N−1) levels. As a result of this, on a printing medium, it is possible to represent densities at N levels (N is an integer not less than 3). In the present embodiment, by the adjustment of the ejection amount such as this, it is possible to print a small dot and a medium dot on a printing medium. It is assumed that the area ratio between the small dot and the medium dot on the printing medium S is about 1:2.

With the configuration as explained above, the printing apparatus 2 ejects each color ink in accordance with print data (ejection data) from each of the nozzle rows 20K, 20C, 20M, and 20Y while moving the printing medium S by using the conveyance roller 22 at a predetermined speed in the x-direction intersecting the nozzle array direction. Due to this, inks are given to the printing medium S in order of the black, cyan, magenta, and yellow inks and a desired image is printed.

Figure 2:
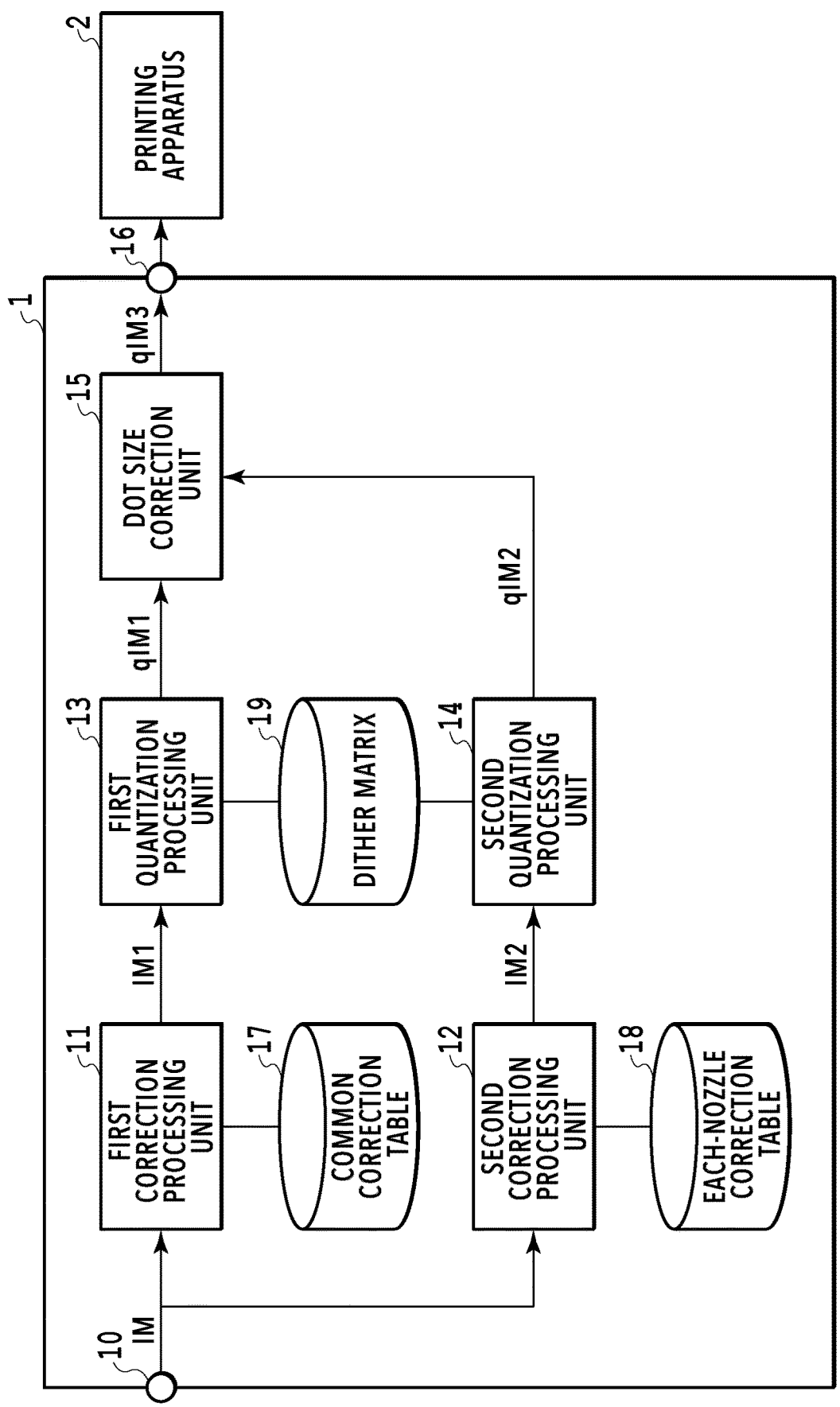
FIG. 2 is a block diagram of an image processing system in a first embodiment.

FIG. 2 is a block diagram for explaining the configuration of processing in the image processing system of the present embodiment. The image processing system includes the printing apparatus 2 explained in FIGS. 1A and 1B and an image processing apparatus 1 for generating print data that is supplied to the printing apparatus 2. The image processing apparatus 1 and the printing apparatus 2 are connected by a printer interface or a network interface.

The image processing apparatus 1 receives a print job for a print output by an input device, not shown schematically, for example, such as a PC, a digital camera, and a mobile terminal, generates print data that the printing apparatus 2 can print based on image data included in the job, and outputs the print data to the printing apparatus 2. In terms of hardware, the image processing apparatus 1 includes a CPU, a ROM, a RAM, and the like, and the CPU controls the entire apparatus in accordance with programs stored in the ROM by using the RAM as a work area. FIG. 2 shows the software processing function performed by the CPU as a block. In the following, detailed explanation is given.

A print job including image data is input to the image processing apparatus 1 from an input terminal 10. In the present embodiment, the image data received by the image processing apparatus 1 is data for each of CMYK indicating the density of each color by 256 (eight bits) tones for each pixel (hereinafter, also described as CMYK data en bloc). That is, in the image data of each color, density information on one of cyan, magenta, yellow, and black is represented by 256 tones for each pixel. In the present embodiment, the image data is input to each of a first correction processing unit 11 and a second correction processing unit 12. The following processing is performed in parallel and similarly for the image data of each of black, cyan, magenta, and yellow, but here, for simplification of explanation, the processing of only the black image data is explained.

The first correction processing unit 11 corrects image data IM of 256 (eight bits) tones by using a common correction table 17 stored in advance in a memory. The image data for which first correction processing has been performed, which is output from the first correction processing unit 11, is represented by 256 (eight bits) tones like the image data IM and described as first corrected data IM1 in the following.

Figure 3A:
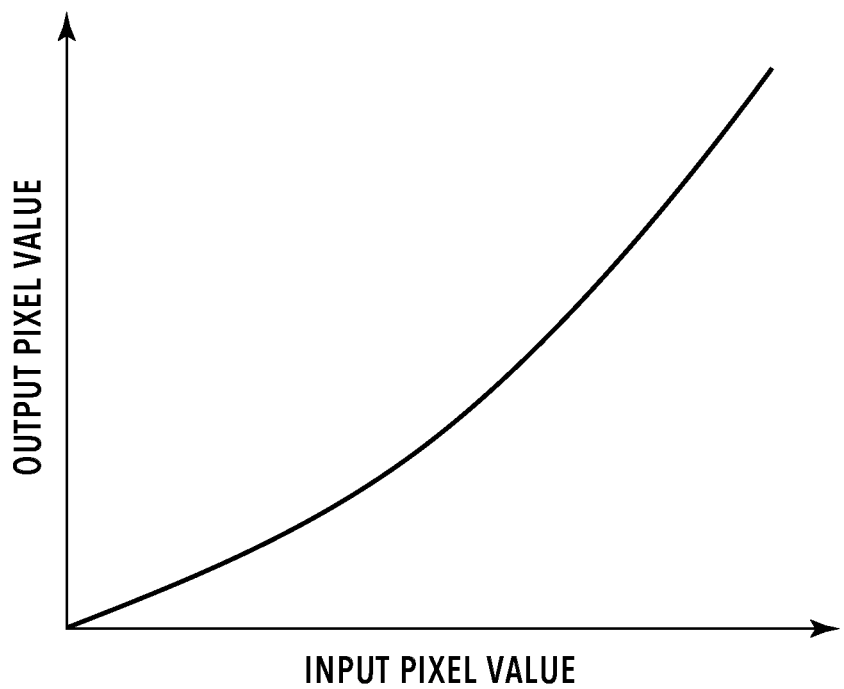
FIGS. 3A and 3B are diagrams showing a common density correction table and a by-nozzle density correction table.

FIG. 3A is a diagram showing the common correction table 17. The horizontal axis represents the input pixel value and the vertical axis represents the output pixel value. In the ink jet printing apparatus, in the low-tone portion in which dots do not overlap, the input density pixel value and the density represented on a printing medium are substantially in a linear relationship, but in the portion whose tone is medium or high where dots overlap, there is a trend for the density not to increase with respect to the input density pixel value. In the first correction processing, by performing conversion processing by using a correction table in the shape inflating downward as shown in FIG. 3A, the input density pixel value and the density represented on a printing medium are brought into a linear relationship.

In the present embodiment, a correction table that takes a nozzle whose ejection amount is large (high-density nozzle), among a plurality of nozzles designed to output the same ejection amount, as a reference is prepared as the common correction table 17. Then, the first correction processing unit 11 performs correction processing for all the pixels of all the nozzles by using this correction table.

On the other hand, the second correction processing unit 12 corrects the image data IM of 256 (eight bits) tones by using an each-nozzle correction table 18 stored in advance in a memory. The image data for which second correction processing has been performed, which is output from the second correction processing unit 12, is represented by 256 (eight bits) tones like the image data IM and described as second corrected data IM2 in the following.

Figure 3B:
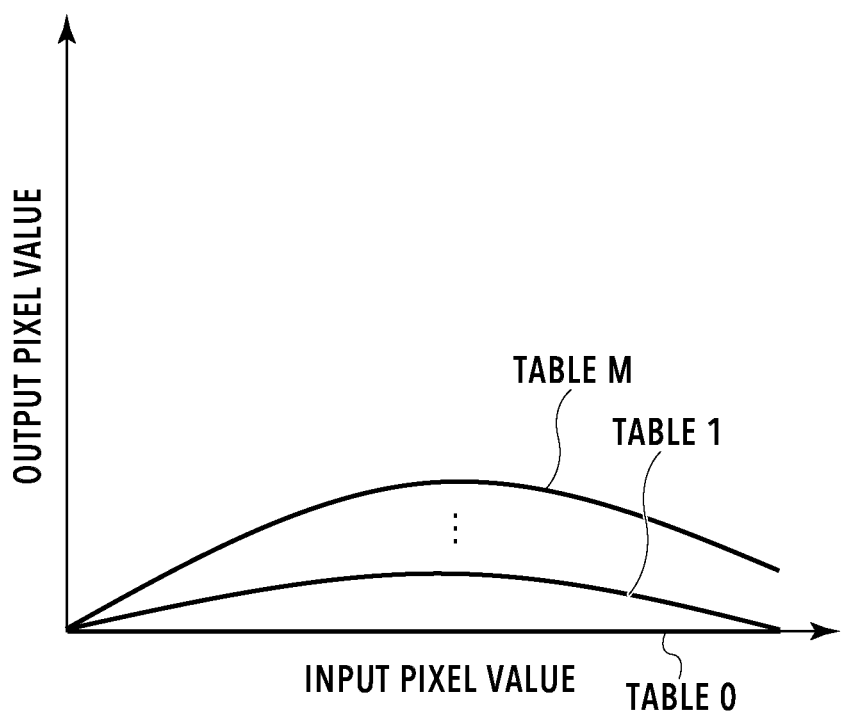

FIG. 3B is a diagram showing the each-nozzle correction table 18. Like FIG. 3A, the horizontal axis represents the input pixel value and the vertical axis represents the output pixel value. The second correction processing unit 12 performs correction processing for making the density represented on a printing medium uniform between nozzles. Because of this, in the each-nozzle correction table 18, the correction amount in the positive direction that is necessary to represent the density equivalent to that of the above-described high-density nozzle is set in association with the input pixel value. Then, the correction table such as this is prepared in a plurality of kinds in accordance with the ejection characteristic of the nozzle. The second correction processing unit 12 selects one table from among the plurality of correction tables in accordance with the nozzle position of the received pixel data and converts the input image data IM into the output image data IM2 by using the selected table.

Returning to the block diagram in FIG. 2. A first quantization processing unit 13 performs binarization processing for each pixel for the first corrected data IM1 output from the first correction processing unit 11 and outputs first binary data qIM1. Specifically, the first quantization processing unit 13 reads a dither matrix 19 stored in advance in a memory and compares a threshold value Th corresponding to the pixel of interest of the dither matrix 19 with the pixel value of the pixel of interest in the first corrected data IM1. Here, for explanation, the pixel value in the first corrected data is also described as IM1. In a case where IM1≥Th, "1" is output and in a case where IM1<Th, "0" is output. In the first binary data qIM1 that is output from the first quantization processing unit 13, the pixel value "1" indicates printing of the small dot and the pixel value "0" indicates non-printing.

On the other hand, a second quantization processing unit 14 performs binarization processing for each pixel for the second corrected data IM2 that is output from the second correction processing unit 12 and outputs second binary data qIM2. At this time, the second quantization processing unit 14 uses the dither matrix 19 in common to that of the first quantization processing unit 13. That is, the second quantization processing unit 14 compares the threshold value Th corresponding to the pixel of interest of the dither matrix 19 with the pixel value of the pixel of interest in the second corrected data IM2. In the following, for explanation, the pixel value in the second corrected data is also described as IM2. In a case where IM2≥Th, "1" is output and in a case where IM2<Th, "0" is output. In the second binary data qIM2 that is output from the second quantization processing unit 14, the pixel value "1" indicates increasing the dot size and the pixel value "0" indicates keeping the dot size.

A dot size correction unit 15 generates ternary data qIM3 based on the binary data qIM1 that is output from the first quantization processing unit 13 and the binary data qIM2 that is output from the second quantization processing unit 14. In detail, the dot size correction unit 15 generates the ternary data qIM3 indicating for each pixel one of the pixel value "2" indicating printing of the medium dot, the pixel value "1" indicating printing of the small dot, and the pixel value "0" indicating non-printing. Specifically, the ternary data qIM3 is generated as follows:

in a case where qIM1=1 and qIM2=1, qIM3=2 (medium dot)

in a case where qIM1=1 and qIM2=0, qIM3=1 (small dot)

in a case where qIM1=0, qIM3=0 (no dot).

The ternary data such as this is transmitted to the printing apparatus 2 as print data via an output terminal 16. The printing apparatus 2 prints a dot of the specified size at the corresponding pixel position by using the corresponding nozzle in accordance with the received print data.

Figure 4:
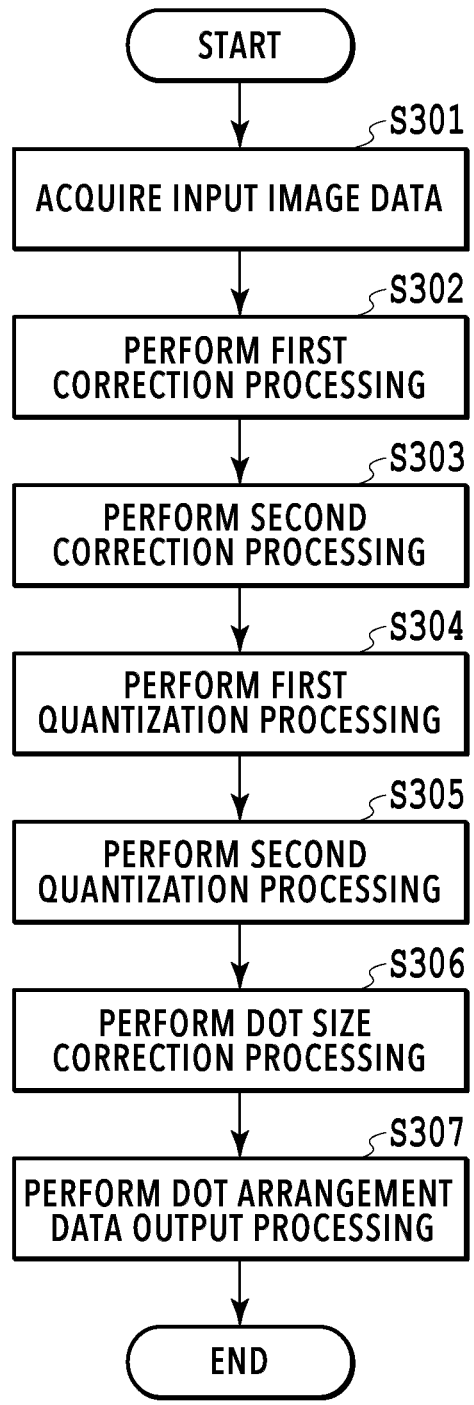
FIG. 4 is a flowchart for explaining a process of image processing.
Figure 5:
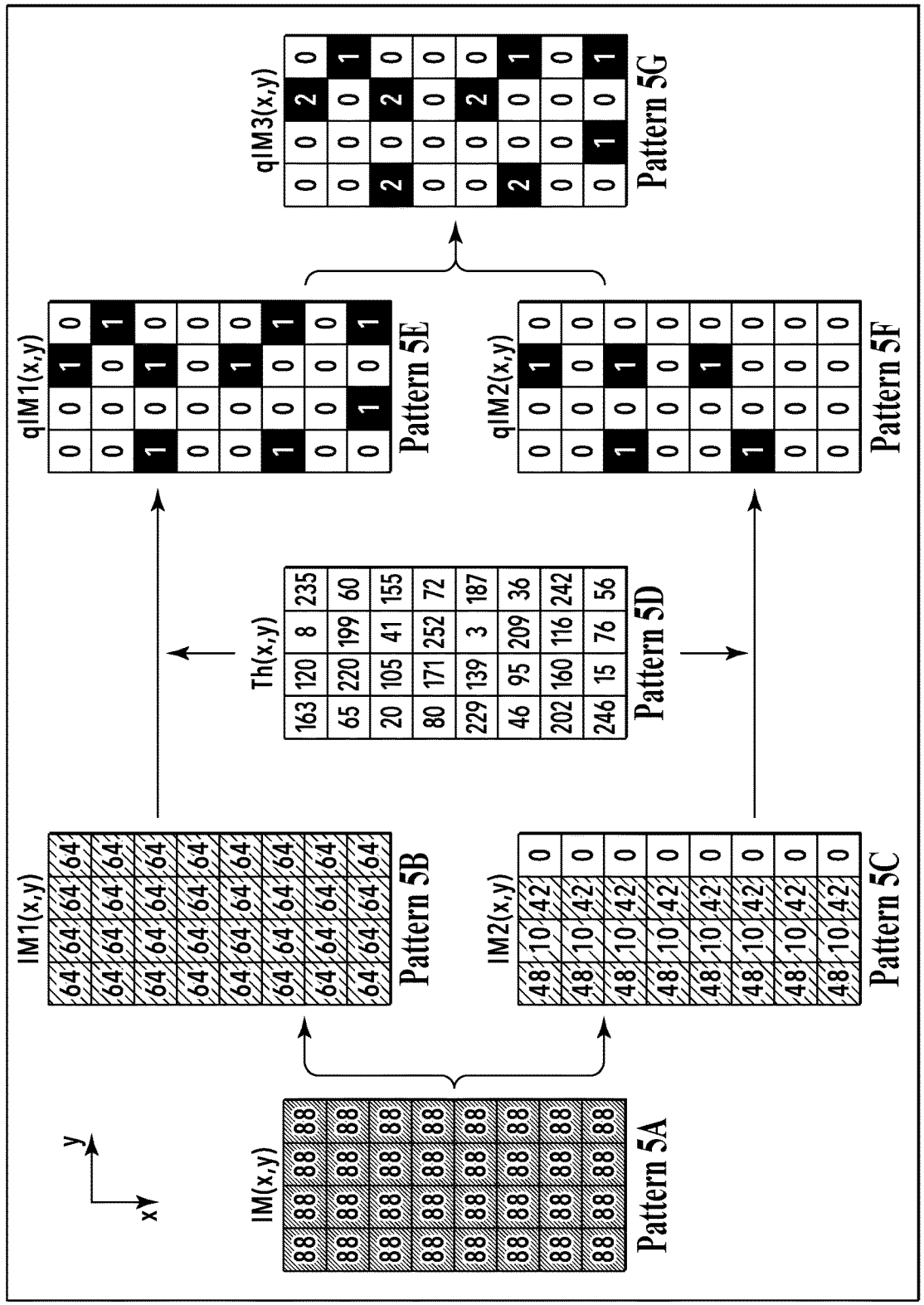
FIG. 5 is a diagram showing the way of conversion of image data in a process of image processing.

FIG. 4 is a flowchart for explaining a process of image processing that the CPU of the image processing apparatus 1 causes each processing unit explained in FIG. 2 to perform. Each configuration (function) is implemented by the CPU reading a program capable of implementing the flowchart shown in FIG. 4 and executing the program. Further, FIG. 5 is a diagram showing the way of conversion of image data in the process of the above-described series of image processing. In the following, with reference to Patterns 5A to 5G; the above-described image processing is explained specifically in accordance with the flowchart in FIG. 4.

The flowchart in FIG. 4 is started by the host apparatus inputting a print job to the image processing apparatus 1. When this processing is started, first, at S301, the CPU acquires input image data of CMYK corresponding to each pixel via the output terminal 10 and loads the data onto the RAM.

Pattern 5A shows an example of part of black input image data loaded onto the RAM at S301. In Pattern s 5A to 5G, the x-direction indicates the conveyance direction of a printing medium and the y-direction indicates the nozzle arrangement direction in the nozzle column 20K. That is, Pattern 5A shows a case where the pixel value "88" is input uniformly to each pixel as black pixel data for eight pixels in the x-direction of each of four nozzles adjacent to one another in the y-direction.

At S302, the first correction processing unit 11 refers to the common correction table 17 and converts the input image data IM corresponding to each pixel into the first corrected data IM1. In the first correction processing, the correction table common to all the pixels is used, and therefore, in a case where the pixel value is the same for all the pixels in the input image data IM, in the output first image data IM1 also, the pixel value is the same for all the pixels. Pattern 5B shows the state where the pixel value "88" of the input image data shown in Pattern 5A is converted uniformly into "64".

At S303, the second correction processing unit 12 converts the pixel value in the input image data IM corresponding to each pixel into the pixel value in the second corrected data IM2 by referring to the each-nozzle correction table 18 and using a one-dimensional correction table associated with each nozzle.

Pattern 5C shows the results of the input pixel values "88" shown in Pattern 5A being corrected by the second correction processing unit 12. In the second correction processing, the correction table that is different for each nozzle is used, and therefore, even though the value is the same for all the pixels in the input image data IM, in the second corrected data IM2, the state is such that the value is different in units of nozzles, that is, depending on the position in the y-direction. Here, of the four nozzles arranged in the y-direction, the nozzle located at the rightmost position is assumed to be the "high-density nozzle" whose ejection amount is the largest of the plurality of nozzles. Then, Pattern 5C shows a case where the ejection amount is small in the order of the nozzle located at the second position from the leftmost position, the nozzle located at the third position from the leftmost position, and the nozzle located at the leftmost position.

For the high-density nozzle located at the rightmost position, in accordance with table 0 in FIG. 3B, for all the pixels, the pixel value is "0" in the second corrected data IM2. Next, for the nozzle located at the second position from the leftmost position, whose ejection amount is the second largest, for all the pixels, the pixel value is "10" in the second corrected data IM2. This means that in order to represent the density equivalent to that of the high-density nozzle, it is necessary to perform correction in the positive direction by about "10" for the pixel value "88" in the input image data IM. For the nozzle located at the third position from the leftmost position, whose ejection amount is the third largest, for all the pixels, the pixel value is "42" in the output image data IM2. For the nozzle located at the leftmost position, whose ejection amount is the fourth largest, for all the pixels, the pixel value is "48" in the output image data IM2. As described above, in the second correction processing, the pixel value in the output image data corresponding the high-density nozzle, which is the reference, is fixed to "0" and the smaller the ejection amount of the nozzle is, the larger the pixel value into which conversion is performed.

At S304, the first quantization processing unit 13 converts the first corrected data IM1 of 256 tones obtained by the first correction processing at S302 into the first binary data qIM1 by using the dither matrix 19. Pattern 5D is a part of the dither matrix 19 that is referred to by the first quantization processing unit 13 and Pattern 5E shows the results of quantization. In the dither matrix 19, the threshold value Th associated with each pixel is determined and the first quantization processing unit 13 binarizes each pixel to "1" or "0" based on the magnitude relationship between the pixel value of each pixel in the first corrected data IM1 and the corresponding threshold value Th. In a case of this example, in the pixel area of 8 pixels×4 pixels, nine pixels are quantized to "1" and 23 pixels are quantized to "0".

At S305, the second quantization processing unit 14 converts the second corrected data IM2 obtained by the second correction processing at S303 into the second binary data qIM2 by using the same dither matrix 19 as that of the first quantization processing. Pattern 5F shows the results of quantization in the second correction processing. In a case of this example, in the pixel area of 8 pixels×4 pixels, two pixels corresponding to the leftmost nozzle and three pixels corresponding to the third nozzle from the left are quantized to "1" and the other pixels are quantized to "0". In the second quantization processing, the smaller the ejection amount of the nozzle is, the higher the probability that the quantized value qIM2 becomes "1" is.

At S306, the dot size correction unit 15 generates the ternary data qIM3 based on the first binary data qIM1 that is output from the first quantization processing unit 13 and the second binary data qIM2 that is output from the second quantization processing unit 14. Pattern 5G shows the ternary data qIM3 in a case where the binary data qIM1 from the first quantization processing unit 13 is that in Pattern 5E and the binary data qIM2 form the second quantization processing unit 14 is that in Pattern 5F. Of the pixels whose binary data qIM1 is "1" in Pattern 5E, only for the pixels whose binary data qIM2 is "1" in Pattern 5F, the quantized value is changed from "1" to "2".

After that, at S307, the CPU outputs the ternary data qIM3 generated at S306 to the printing apparatus 2 via the output terminal 16. By the above, this processing terminates.

In the above, explanation is given by the aspect in which the second correction processing is performed at S303 after performing the first correction processing at S302 and the second quantization processing is performed at S305 after performing the first quantization processing at S304, but the order of the processing is not limited to this. It may also be possible to perform the first correction processing after performing the second correction processing or perform both in parallel. Further, it may also be possible to perform the first quantization processing after performing the second quantization processing or perform both in parallel.

According to the present embodiment, the same dither matrix 19 is used in the first quantization processing and the second quantization processing, and therefore, it is possible to include all the pixels for which printing "1" is determined by the second quantization processing in the pixels for which printing "1" is determined by the first quantization processing. Then, among the pixels for which printing "1" is determined by the first quantization processing, the pixel (nozzle) whose ejection amount is smaller and the correction amount is larger is more likely to take the quantized value "2". In the example in Pattern 5G, in the nozzle at the leftmost position, whose ejection amount is the smallest, and in the third nozzle from the leftmost position, whose ejection amount is the second smallest, the quantized value is corrected from "1" to "2".

Figure 6:
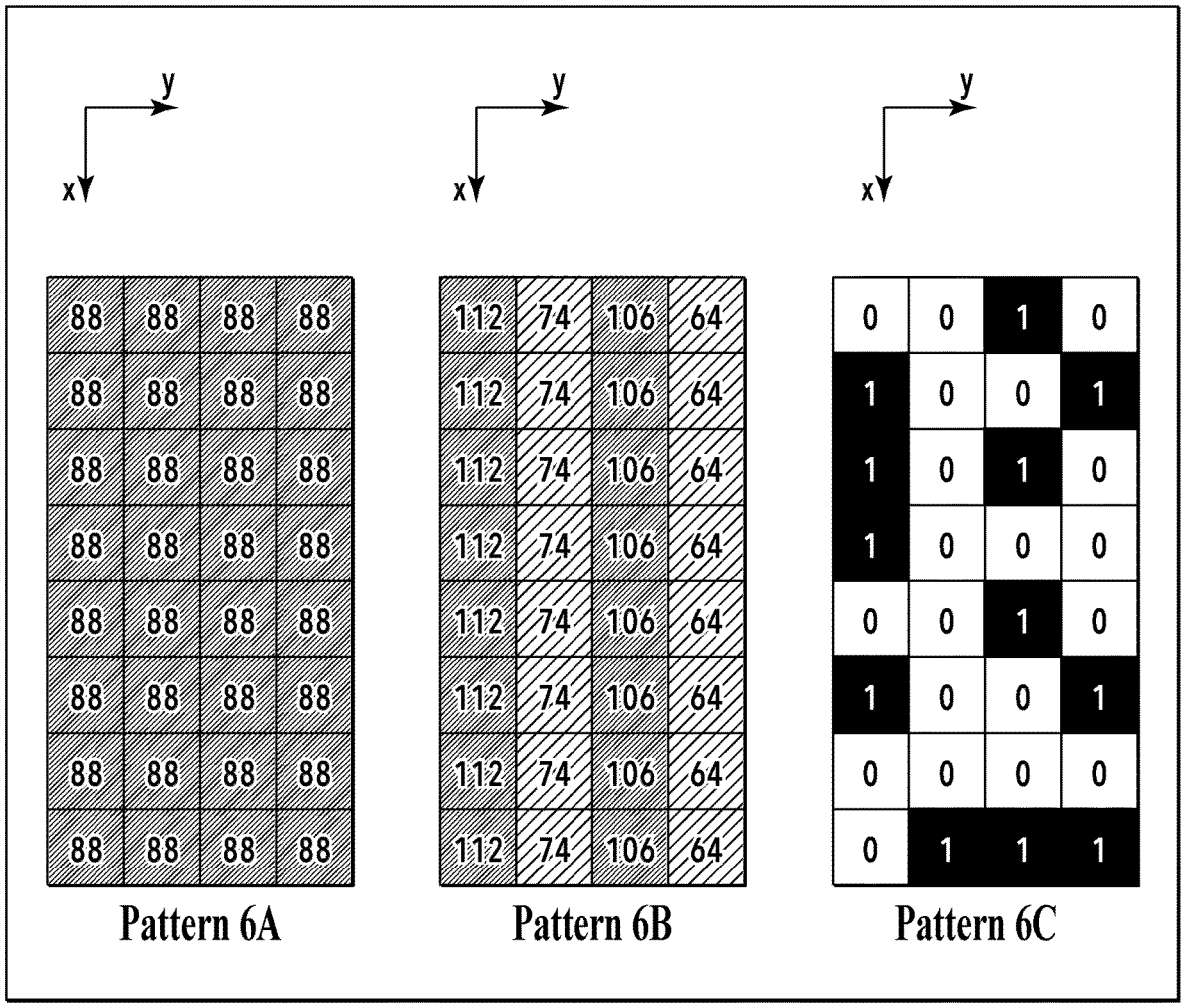
FIG. 6 is a diagram showing the way of conversion of image data in a case where a conventional method is adopted.

In the following, the effect of the present embodiment is explained by using a comparison example. FIG. 6 is a diagram showing the way of conversion of image data in a case where Japanese Patent Laid-Open No. H4-41243 is adopted as the conventional method. Like Pattern 5A, Pattern 6A shows black image data received by the image processing apparatus. Like Pattern 5A, the state is shown where the pixel value "88" is input uniformly in the pixel area of 8 pixels×4 pixels.

According to Japanese Patent Laid-Open No. H4-41243, after performing the processing corresponding to the first correction processing of the first embodiment, that is, the correction processing using the correction table common to all the pixels for the multi-valued data such as this, the correction processing for each nozzle, which uses the correction table in accordance with the ejection characteristic of the nozzle, is performed. That is, the correction processing that causes the density signal of the nozzle whose ejection amount is small to have a higher value is performed.

Pattern 6B shows the image data after the above-described correction processing for each nozzle has been performed. In this example also, it is assumed that the ejection amount of the nozzle located at the rightmost position is the largest and the ejection amount becomes smaller in order of the nozzle located at the second position from the leftmost position, the nozzle located at the third position from the leftmost position and the nozzle located at the leftmost position. Consequently, in the data after correction, the correction has been performed so that the pixel value of the nozzle located at the rightmost position is the smallest and the pixel value becomes larger in order of the nozzle located at the second position form the leftmost position, the nozzle located at the third position from the leftmost position and the nozzle located at the leftmost position.

Pattern 6C is a diagram showing the results of binarizing the image data in Pattern 6B by using the dither matrix shown in Pattern 5D, which is the same as that of the present embodiment. The nozzle that is corrected so that the ejection amount becomes smaller and the pixel value becomes larger has a higher probability that the quantized value becomes "1". In a case of this example, as shown in Pattern 6C, the pixel in which a dot is printed occurs continuously in the x-direction or the y-direction.

Figure 7:
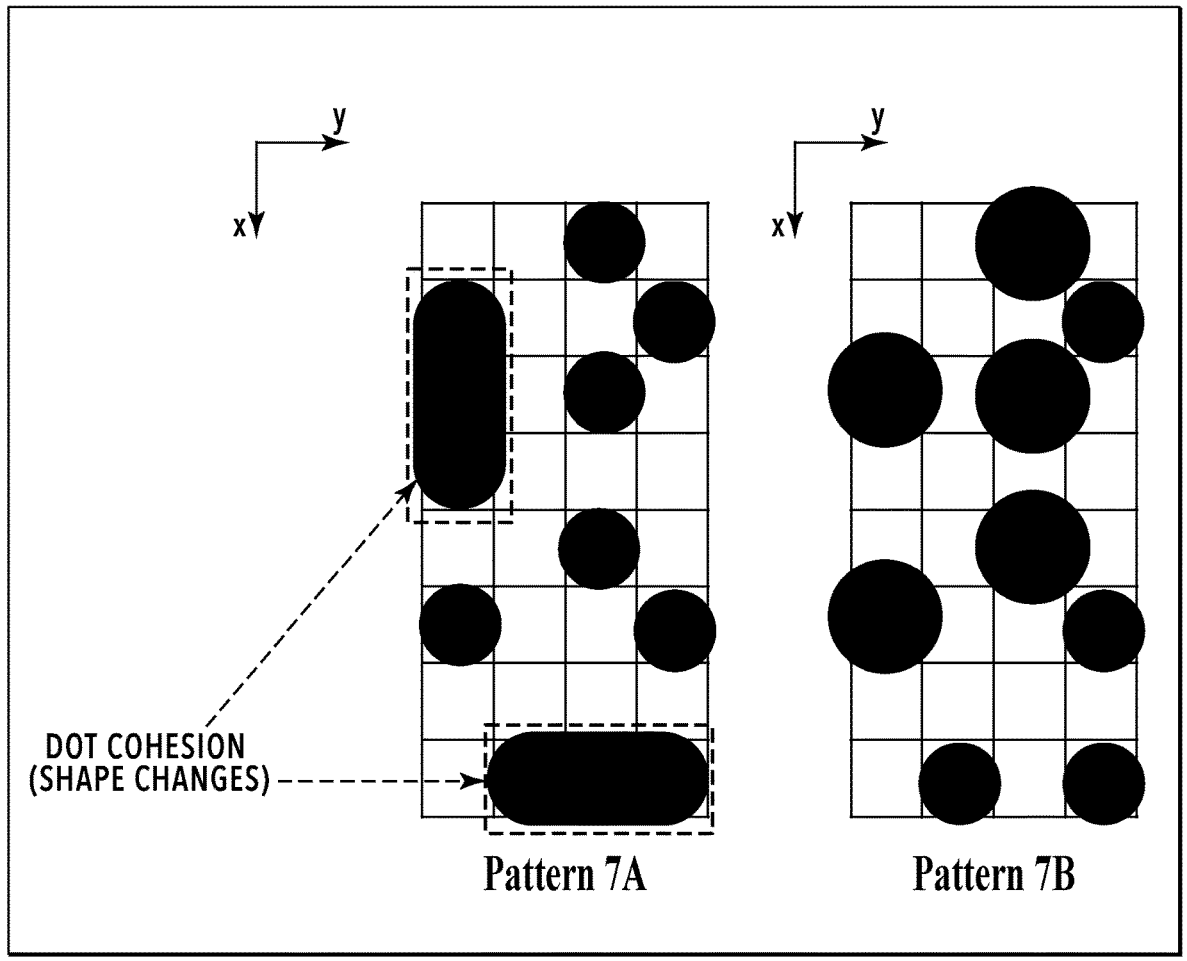
FIG. 7 is a diagram comparing a dot pattern between the conventional method and the present embodiment.

FIG. 7 is a diagram that compare a pattern in which dots are printed in accordance with the quantization results by the conventional method shown in Pattern 6C and a pattern in which dots are printed in accordance with the quantization results of the present embodiment shown in Pattern 5G.

In the conventional method shown in Pattern 7A, the number of dots printed by the nozzle whose ejection amount is small is increased, and therefore, the density unevenness resulting from the variation in the ejection characteristic of the nozzle is mitigated. However, by new dots being added, a variation of dot concentration is brought about and the ink droplets printed continuously at the adjacent positions cohere to one another on the paper surface and become more likely to form a large dot. That is, even though a dither matrix that is created so as to obtain high dispersibility is used, the dispersibility is not reflected sufficiently, and therefore, an image in which the granularity is conspicuous will result.

On the other hand, with the dot pattern of the present embodiment shown in Pattern 7B, the size of the dot printed by the nozzle whose ejection amount is small is increased, and therefore, the density unevenness resulting from the variation in the ejection characteristic of the nozzle is mitigated. Because of this, the dot pattern in which the dispersibility of the dither matrix is reflected is maintained.

That is, according to the present embodiment explained above, it is possible to change the dot of the nozzle whose ejection amount is small from the small dot to the medium dot while maintaining the dot arrangement specified by the dither matrix. At this time, the dot size of the nozzle other than the high-density nozzle is changed so as to obtain the density equivalent to that of the high-density nozzle, and therefore, no dot is added to or deleted from the dot arrangement specified by the dither matrix. As a result of that, it is made possible to reduce the density unevenness accompanying the variation in the ejection characteristic of each nozzle without worsening the granularity of an image.

In the above, the example is explained in which the first quantization processing unit 13 quantizes data into binary data and the dot size correction unit 15 changes the binary data to ternary data, but the present embodiment is not limited to the aspect such as this. The present embodiment may be any aspect as long as the first quantization processing unit 13 quantizes data into N-valued data and the dot size correction unit 15 changes the N-valued data into (N+1)-valued data.

That is, in a case where it is possible for the printing apparatus to represent (N+1)-valued densities for each pixel, it is sufficient for the first quantization processing unit 13 to quantize IM into 0– to (N−1)-valued data and take this as qIM1. After that, it is sufficient for the dot size correction unit 15 to set qIM3=qIM1+1 in a case where qIM1≠0 and qIM2=1 and set qIM3=qIM1 in the other cases.

As an example, a case where it is possible for the print head to print dots of three sizes, that is, large, medium, and small dots, is considered. In this case, it is sufficient for the first quantization processing unit 13 to quantize data into ternary data in which "1" indicates printing of the small dot, "2" indicates printing of the medium dot, and "0" indicates printing of no dot. Then, it is sufficient for the dot size correction unit 15 to correct the ternary qIM1 of 0 to 2 as follows based on the binary qIM2, which is the results of the second quantization processing unit, and generate quaternary data qIM3 of 0 to 3 as follows:

in a case where qIM1=1 and qIM2=1, qIM3=2 (medium dot)
in a case where qIM1=2 and qIM2=1, qIM3=3 (large dot)
in a case where qIM1=1 and qIM2=0, qIM3=1 (small dot)
in a case where qIM1=2 and qIM2=0, qIM3=2 (medium dot)
in a case where qIM1=0, qIM3=0 (no dot)

Second Embodiment

In the present embodiment also, like the first embodiment, it is assumed that the printing apparatus 2 explained in FIGS. 1A and 1B is used. However, in the present embodiment, it is assumed that each nozzle arrayed in the nozzle row 20 of the print head can print dots of three sizes, that is, a small dot, a medium dot, and a large dot. In the present embodiment, it is assumed that the area ratio of the small dot, the medium dot, and the large dot on a printing medium is about 1:2:3.

Figure 8:
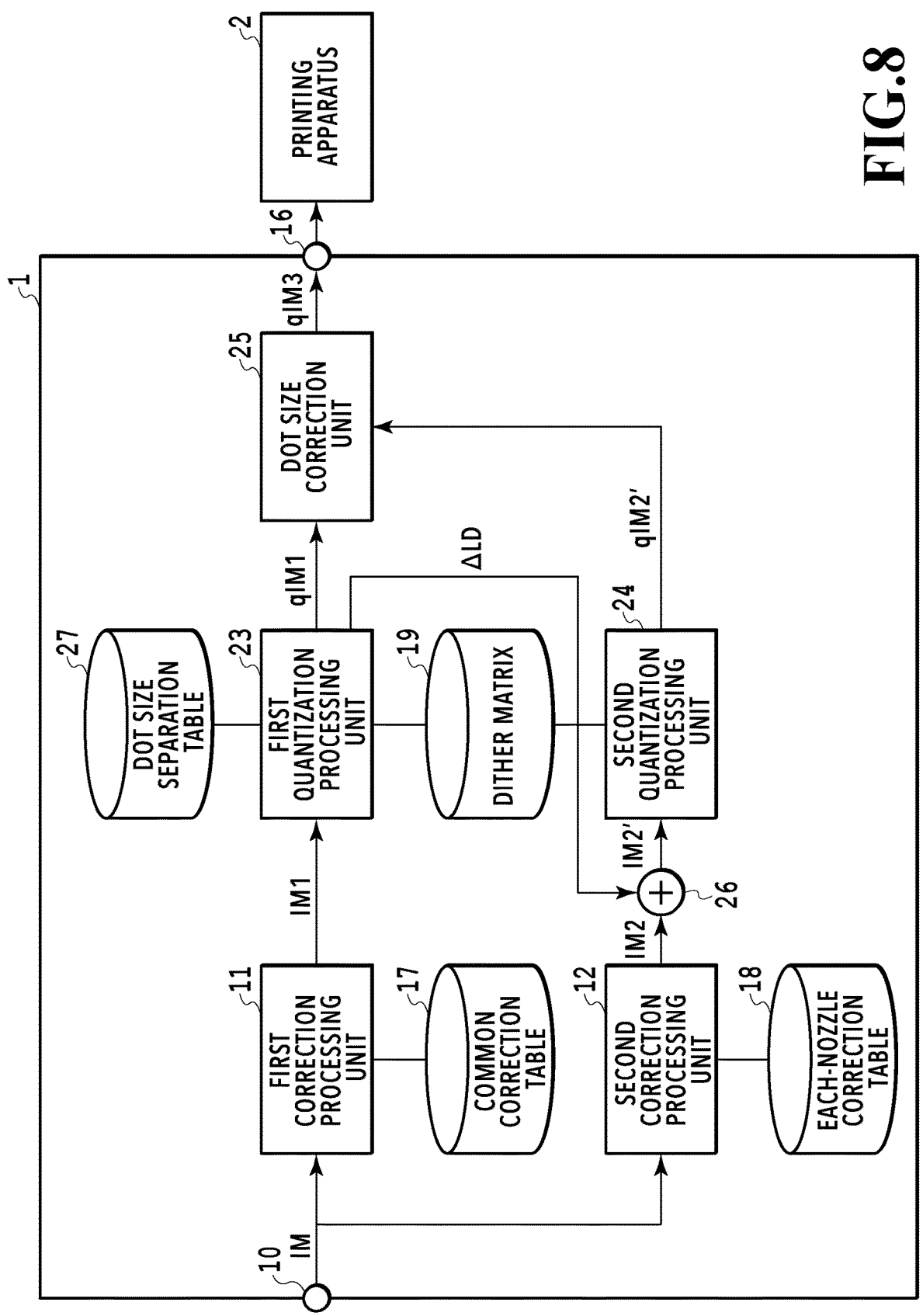
FIG. 8 is a block diagram of an image processing system in a second embodiment.

FIG. 8 is a block diagram for explaining the configuration of processing in an image processing system of the present embodiment. The processing of the first correction processing unit 11 and the second correction processing unit 12 and the contents of the correction tables 17 and 18 used by these processing units are the same as those of the first embodiment explained in FIG. 2, and therefore, explanation is omitted.

A first quantization processing unit 23 of the present embodiment separates the multi-valued first corrected data IM1 into large dot multi-valued data LM1, medium dot multi-valued data MM1, and small dot multi-valued data SM1 by using a dot size separation table 27 stored in advance in a memory.

Figure 9:
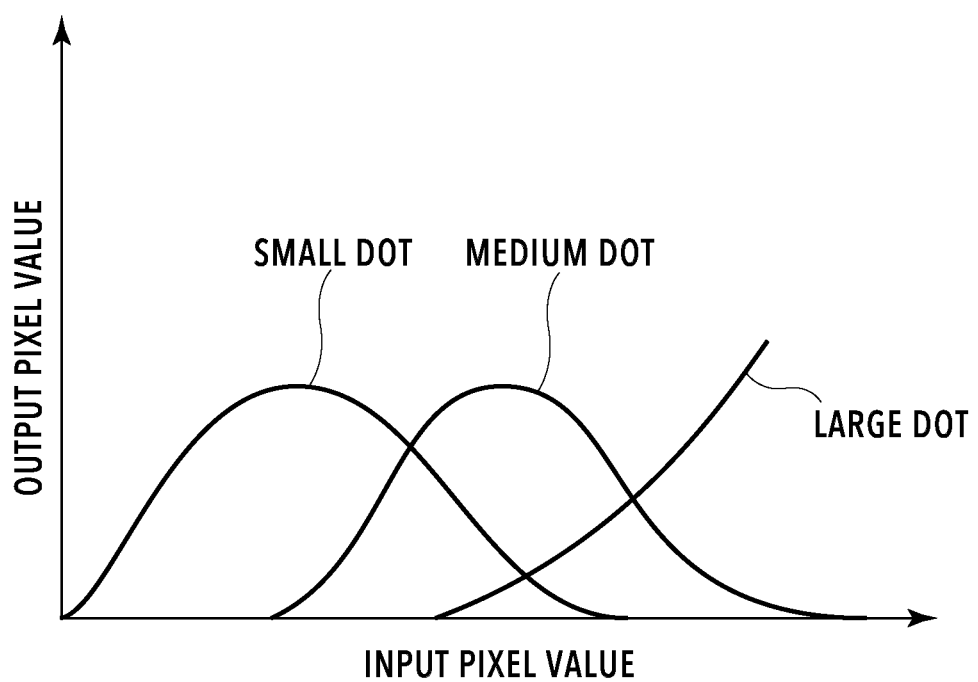
FIG. 9 is a diagram showing a dot size separation table.

FIG. 9 is a diagram showing the dot size separation table 27. The horizontal axis represents the input pixel value and the vertical axis represents the output pixel value. The output pixel value corresponding to each size increases or decreases in accordance with the input pixel value so that only the small dot is used in the highlight portion where the input pixel value is small, the large, medium, and small dots are used mixedly in the medium-density area, and only the large dot is used in the high-density area. The first quantization processing unit 23 of the present embodiment generates quaternary data qIM1 by comparing each of the small dot multi-valued data SM1, the medium dot multi-valued data MM1, and the large dot multi-valued data LM1 obtained by using the table such as this with the threshold value Th of the dither matrix 19.

In the following, specific explanation is given. The first quantization processing unit 23 first compares the large dot multi-valued data LM1 with the threshold value Th stored in the dither matrix 19. Then, in a case where LM1≥Th, "3" is set as qIM1 and in a case where LM1<Th, "0" is set as qIM1.

Next, the first quantization processing unit 23 compares a sum SUM1 of the medium dot multi-valued data MM1 and the large dot multi-valued data LM1 with the threshold value Th stored in the dither matrix 19. Then, in a case where SUM1≥Th and qIM1=0 in the current stage, "2" is set and in a case where SUM1<Th, "0" is set.

Further, the first quantization processing unit 23 compares a sum SUM2 of the small dot multi-valued data SM1, the medium dot multi-valued data MM1, and the large dot multi-valued data LM1 with the threshold value Th stored in the dither matrix 19. Then, in a case where SUM2≥Th and qIM1=0 in the current stage, "1" is set and in a case where SUM2<Th, "0" is set.

By the above, the pixel value of each pixel in the first corrected data IM1 is quantized into a quaternary value indicating one of values 0 to 3. As described above, by setting the printing position in accordance with the dither matrix in order of the large dot likely to be conspicuous visually, the medium dot, and the small dot, it is possible to further reduce the granularity of the entire image.

On the other hand, the first quantization processing unit 23 calculates an error $\Delta$LD (=IM1−255) between the first corrected data IM1 and the maximum pixel value for the pixel for which qIM1=3 and outputs the error $\Delta$LD to an adder 26. The adder 26 generates a new pixel value IM2' by adding the above-described error $\Delta$LD to the pixel value of each pixel in the second corrected data IM2 from the second correction processing unit 12 and transmits the pixel value IM2' to a second quantization processing unit 24. Then, the second quantization processing unit 24 compares the new pixel value IM2' with the threshold value Th corresponding to each pixel position stored in the dither matrix 19 and outputs binary data qIM2'.

A dot size correction unit 25 generates the quaternary data qIM3 indicating one of large dot "3", medium dot "2", small dot "1", and non-printing "0" based on the binary data qIM1 from the first quantization processing unit 23 and the binary data qIM2' from the second quantization processing unit 24. Specifically, qIM3 is generated as follows:

in a case where qIM1≠0 and qIM2=1, qIM3=qIM1+1
however, in a case where qIM3=4, qIM3=3 (limit processing)
in a case where qIM1≠0 and qIM2=0, qIM3=qIM1
in a case where qIM1=0, qIM3=0.

The quaternary data such as this is transmitted as print data to the printing apparatus 2 via the output terminal 16. The printing apparatus 2 prints the dot of the specified size at the corresponding pixel position by using the corresponding nozzle in accordance with the print data. That is, in a case where qIM3=3, the large dot is printed, in a case where qIM3=2, the medium dot is printed, in a case where qIM3=1, the small dot is printed, and in a case where qIM3=0, no dot is printed.

Here, the error $\Delta$LD (=IM1-255) that is generated by the first quantization processing unit 23 and which is added to the adder 26 is a difference between the input density pixel value IM1 and the maximum density pixel value 255 corresponding to printing of the large dot in the pixel for which printing of the large dot is set. Consequently, by adding the error to the corrected value IM2 in the positive direction (substantially subtracting the error from the corrected value IM2), which is output from the second correction processing unit 12, the correction amount in the pixel is reduced and the possibility that the quantized value becomes "1" in the second quantization processing unit 24 becomes faint. That is, for the pixel to which printing of the large dot has already been set and for which a dot larger than the current dot cannot be printed, it is possible to keep low the probability that the dot size change is specified.

As a result of that, according to the present embodiment, it is made possible to reduce the density unevenness accompanying the variation in the ejection characteristic of each nozzle without worsening the granularity of an image.

Third Embodiment

In the present embodiment also, like the first embodiment, the printing apparatus 2 explained in FIGS. 1A and 1B is used. Then, it is assumed that each nozzle arrayed in the nozzle row 20 of the print head can print dots of three sizes, that is, a small dot, a medium dot, and a large dot. In the present embodiment, it is assumed that the area ratio of the small dot, the medium dot, and the large dot on a printing medium is about 1:2:3.

Figure 10:
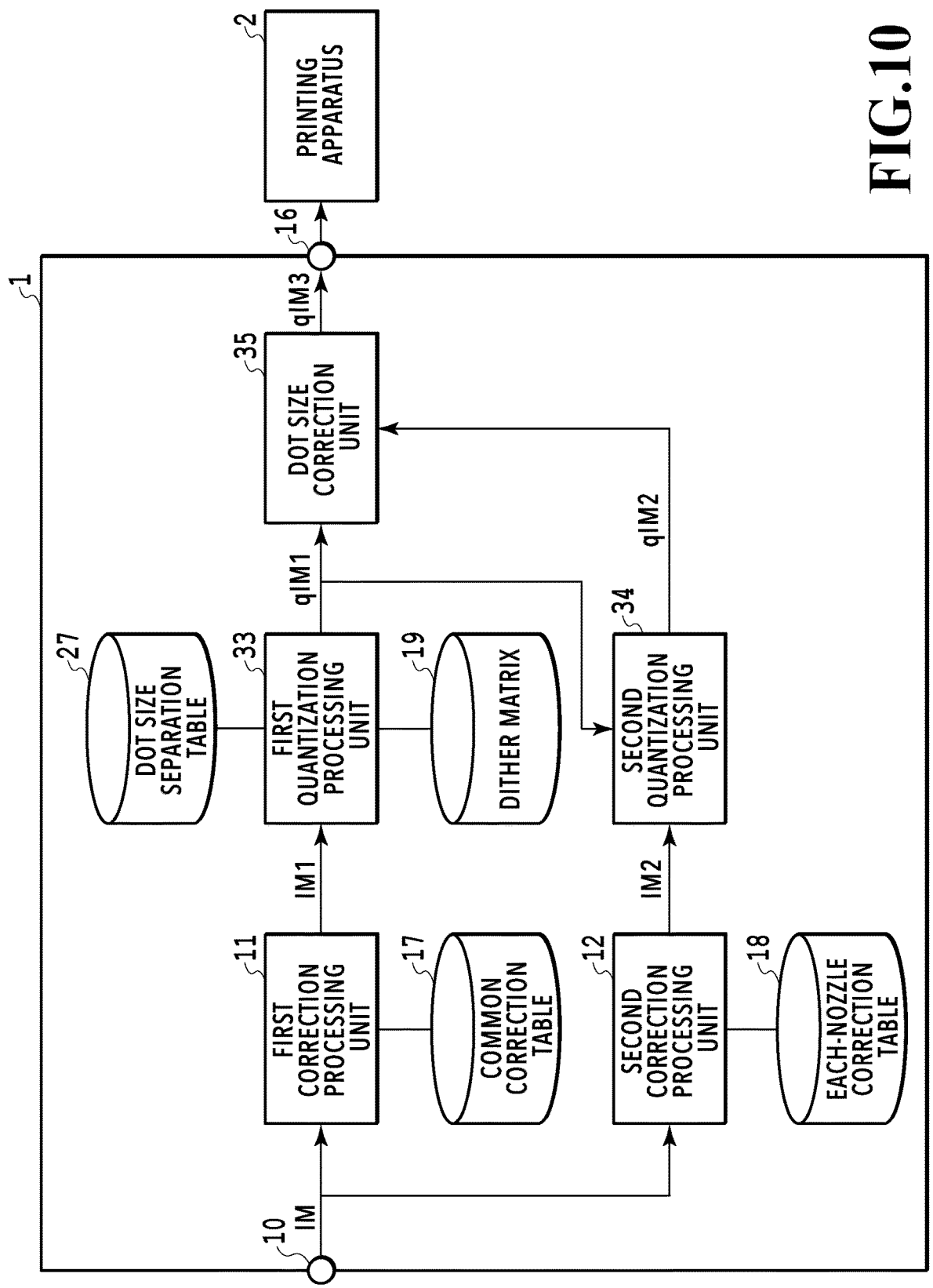
FIG. 10 is a block diagram of an image processing system in a third embodiment.

FIG. 10 is a block diagram for explaining the configuration of processing in an image processing system of the present embodiment. The processing of the first correction processing unit 11 and the second correction processing unit 12 and the contents of the correction tables 17 and 18 used by these processing units are the same as those of the first embodiment explained in FIG. 2, and therefore, explanation is omitted.

Like the second embodiment, a first quantization processing unit 33 of the present embodiment refers to the dot size separation table 27 and generates the quaternary (0 to 3) quantized data qIM1 by the same process as that of the second embodiment. Then, the first quantization processing unit 33 outputs the obtained results of the quantization to a second quantization processing unit 34.

The second quantization processing unit 34 of the present embodiment quantizes the second corrected data IM2 output from the second correction processing unit 12 by the error diffusion method without using the dither matrix 19, which is different from the above-described embodiment in which the dither matrix 19 is used. At this time, the second quantization processing unit 34 refers to the quantization results of the first quantization processing unit 33 and does not set the quantized value qIM2 to "1" for the pixel whose quantized value qIM1 is maximum value of "3" or minimum value of "0". That is, the second quantization processing unit 34 sets the pixel whose dot size is increased by using the error diffusion method among the pixels to which the dot whose size can be increased is set, that is, the pixels whose quantized value qIM1 is "1" or "2". As described above, by setting the pixel whose dot size is increased by using the error diffusion method, it is possible to arrange the dot whose size has been increased and which is relatively conspicuous with dispersibility higher than that of the above-described embodiment.

A dot size correction unit 35 generates the quaternary data qIM3 indicating one of large dot "3", medium dot "2", small dot "1", and non-printing "0" based on the binary data qIM1 from the first quantization processing unit 33 and the binary data qIM2 from the second quantization processing unit 34. Specifically, qIM3 is generated as follows:

in a case where qIM2=1, qIM3=qIM1+1
in a case where qIM1=0, qIM3=qIM1.

According to the present embodiment explained above, it is possible to reduce the density unevenness accompanying the ejection characteristic of the nozzle without addition of dot to or deletion of dot from the dot arrangement specified by the dither matrix. Further, it is possible to arrange the dot whose size has been increased and which is relatively conspicuous with higher dispersibility.

In the above, by taking the case where the nozzle row 20 of the print head prints the dots at three levels, that is, the large, medium, and small dots as an example, the aspect is explained in which the first quantization processing unit 33 and the dot size correction unit 35 respectively output the quaternary quantized data, but the present embodiment is not limited to this. In a case where it is possible for the second quantization processing unit 34 to perform the error diffusion processing so that the quantized value qIM2 is not set to "1" for the pixel whose quantized value qIM1 of the first quantization processing unit 33 is the maximum value or the minimum value, it is also possible to generate quinary quantized data, senary quantized data, and so on.

Fourth Embodiment

In the present embodiment also, like the first embodiment, it is assumed that the printing apparatus 2 explained in FIGS. 1A and 1B is used. Then, it is assumed that each nozzle arrayed in the nozzle row 20 can print dots of three sizes, that is, a small dot, a medium dot, and a large dot.

Figure 11:
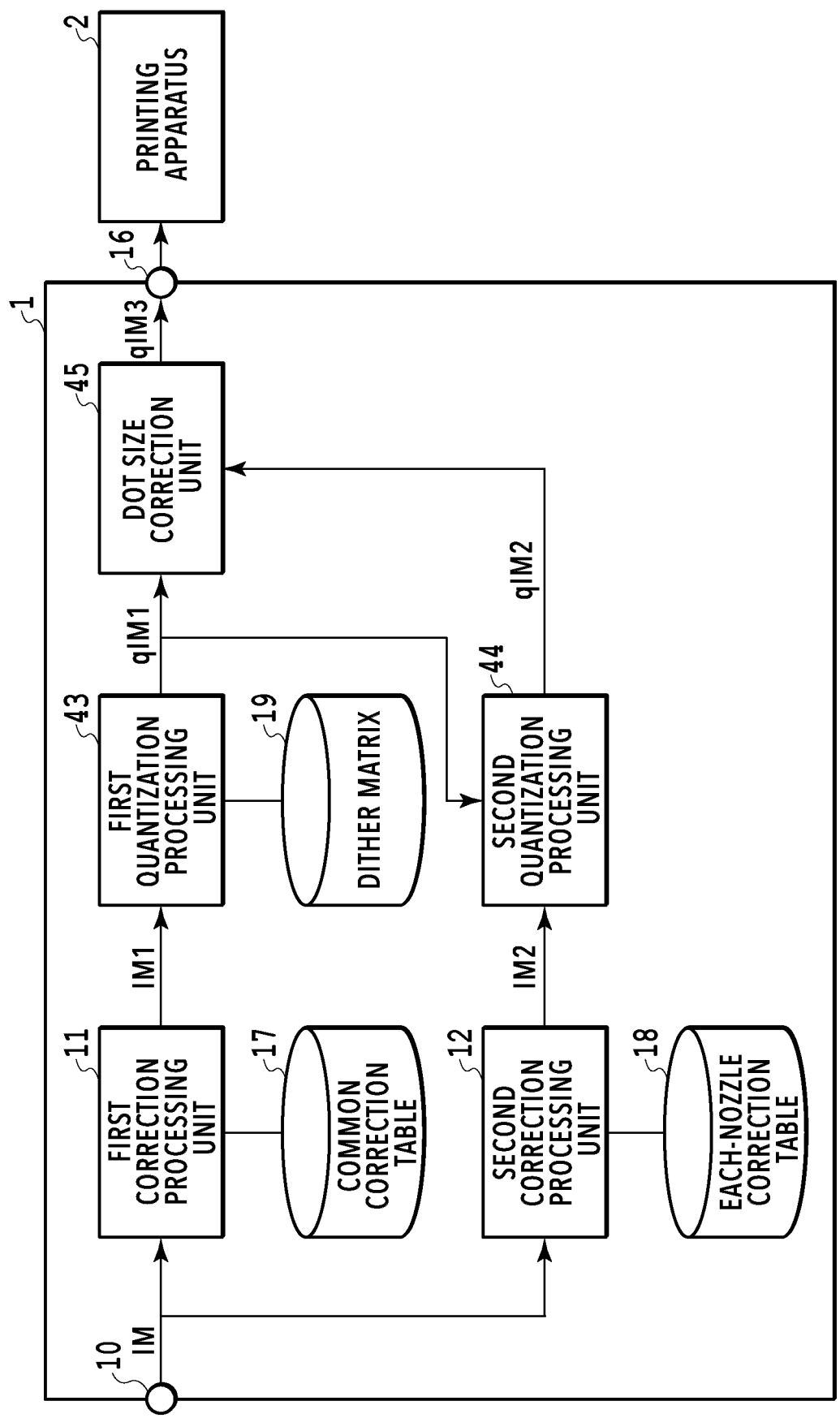
FIG. 11 is a block diagram of an image processing system in a fourth embodiment.

FIG. 11 is a block diagram for explaining the configuration of processing in an image processing system of the present embodiment. The processing of the first correction processing unit 11 and the second correction processing unit 12 and the contents of the correction tables 17 and 18 used by these processing units are the same as those of the first embodiment explained in FIG. 2, and therefore, explanation is omitted.

A first quantization processing unit 43 of the present embodiment performs quantization processing for the dots except for the largest dot by using the dither matrix 19. That is, the first quantization processing unit 43 quantizes the multi-valued first corrected data IM1 into ternary data indicating one of printing of medium dot "2", printing of small dot "1", and non-printing of dot "0" and outputs it as the quantized data qIM1.

On the other hand, a second quantization processing unit 44 refers to the quantized data qIM1 of the first quantization processing unit 43 and performs the error diffusion processing under a restriction that the quantized value of the pixel whose minimum value is "0" in the quantized data qIM1 is not set to "1". Then, the second quantization processing unit 44 outputs the obtained binary quantized data qIM2 to a dot size correction unit 45.

The dot size correction unit 45 generates the quaternary data qIM3 indicating one of large dot "3", medium dot "2", small dot "1", and non-printing "0" based on the ternary data qIM1 from the first quantization processing unit 43 and the binary data qIM2 from the second quantization processing unit 44. Specifically, the dot size correction unit 45 generates the quaternary data qIM3 in accordance with the following:

in a case where qIM2=1, qIM3=qIM1+1
in a case where qIM2=0, qIM3=qIM1.

The quaternary ((N+1) revel) data qIM3 generated by the dot size correction unit 45 is transmitted as print data to the printing apparatus 2 via the output terminal 16. The printing apparatus 2 prints the dot of the specified size at the corresponding pixel position by using the corresponding nozzle in accordance with the received print data. That is, the printing apparatus 2 prints the large dot in a case where qIM3=3, the medium dot in a case where qIM3=2, the small dot in a case where qIM3=1, and no dot in a case where qIM3=0.

In the present embodiment explained above also, it is possible to increase the dot size of the nozzle whose ejection amount is small while maintaining the dot arrangement specified by the dither matrix. As a result of that, it is made possible to reduce the density unevenness accompanying the variation in the ejection characteristic of each nozzle without worsening the granularity of an image.

Other Embodiments

In the above embodiments, explanation is given by taking the case as an example where the full line type ink jet printing apparatus as in FIGS. 1A and 1B is used as the printing apparatus 2. However, it is also possible to use the present invention favorably also in a serial type ink jet printing apparatus that alternately performs the printing scan of the print head for a printing medium and the conveyance operation to convey the printing medium in the direction intersecting that of the printing scan. The reason is that even in the serial type printing apparatus, there is a tendency for the ejection characteristic of each nozzle to appear on the same pixel line in a case where an image is completed by single-pass printing, and therefore, it is possible to obtain the same effect as that of the above-described embodiments by using the image processing explained in the above-described embodiments.

Further, in the above, explanation is given on the assumption of the configuration in which the piezo element is provided to each nozzle and the dot size can changed by changing the pulse shape of the voltage to be applied to the piezo element, but the present invention is not limited to the aspect such as this. It may also be possible to provide an electro-thermal conversion element for causing film boiling to take place in the ink within the nozzle to each nozzle in place of the pixel element. At this time, in a case where it is difficult to print dots of different sizes by one nozzle, it may also be possible to prepare a plurality of nozzle rows for each dot size, such as the nozzle row for the large dot and the nozzle row for the small dot.

Further, the method of representing the ternary, quaternary or more quantized value by dots is not limited to the method of making the dot size differ, such as the large dot, the medium dot, and the small dot. It may also be possible to adopt a method of making the dot density differ, such as a dark dot, a medium dot, and a pale dot.

Further, in the above embodiments, explanation is given by the aspect in which the multi-valued image data of each of black, cyan, magenta, and yellow is input to the image processing apparatus 1, but the image processing apparatus of the present invention is not limited to the aspect such as this. For example, as the image processing apparatus 1, it is also possible to take the printer driver installed in the host apparatus, which is the supply source of the input image data IM. In this case, it is sufficient to generate the multi-valued image data IM by performing predetermined image processing for image data generated by an application installed in the host apparatus and then perform the characteristic image processing of the present invention as described above.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to reduce the density unevenness accompanying the variation in the ejection characteristic of each nozzle without worsening the granularity of an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-214958, filed Nov. 15, 2018, which is hereby incorporated by reference wherein in its entirety.

What is claimed is:

1. An image processing apparatus that generates N-valued (N is an integer not less than 3) print data for representing densities at N levels on a printing medium by relatively moving, with respect to a print head in which a plurality of nozzles capable of representing densities at the N levels is arrayed in a predetermined direction, the printing medium in a direction intersecting the predetermined direction, the image processing apparatus, comprising:
   an acquisition unit configured to acquire image data;
   a first correction unit configured to generate first corrected data by correcting the image data by using a first correction table which is made based on a density characteristic of a part of the plurality of nozzles;
   a second correction unit configured to generate second corrected data by correcting the image data by using a second correction table which is made based on each density characteristic of the plurality of nozzles;
   a first quantization unit configured to generate first quantized data by quantizing the first corrected data;
   a second quantization unit configured to generate second quantized data by quantizing the second corrected data; and
   a generation unit configured to generate the N-valued print data based on the first quantized data and the second quantized data.

2. The image processing apparatus according to claim 1, wherein
   a position at which the N-valued print data indicates a dot to be printed is a position at which the first quantized data indicates a dot to be printed.

3. The image processing apparatus according to claim 1, wherein
   the generation unit corrects a dot size based on the second quantized data for at least a part of positions at which the first quantized data a dot to be printed.

4. The image processing apparatus according to claim 3, wherein
   the second quantization unit generates binary second quantized data having a value of 1 or 0 and
   the generation unit generates, for a pixel whose value is 1 in the second quantized data, the N-valued print data by correcting a value of the pixel in the first quantized data to a value one value larger.

5. The image processing apparatus according to claim 1, wherein
   the first correction table is a correction table created by taking a high-density nozzle representing a relatively high density as a standard among the plurality of nozzles and
   the second correction table is a correction table created in association with each nozzle for representing a density equivalent to that of the high-density nozzle.

6. The image processing apparatus according to claim 1, wherein
   the first quantization unit and the second quantization unit generate the first quantized data and the second quantized data, respectively, by using an identical dither matrix.

7. The image processing apparatus according to claim 1, wherein
   the first quantization unit generates the first quantized data by using a dither matrix and
   the second quantization unit generates the second quantized data by error diffusion processing.

8. The image processing apparatus according to claim 1, wherein
   the first quantization unit generates (N−1)-valued quantized data as the first quantized data and
   the generation unit generates, for a pixel whose value is 1 in the second quantized data, the N-valued print data by correcting a value of the pixel in the first quantized data to a value one value larger.

9. The image processing apparatus according to claim 8, wherein
   the second quantization unit generates the second corrected data so that a value of the second quantized data does not become 1 for a pixel whose value of the first quantized data is a minimum value.

10. The image processing apparatus according to claim 1, wherein
   the first quantization unit generates N-valued quantized data as the first quantized data and
   the second quantization unit quantizes the second corrected data after adding a difference between the first corrected data and a maximum value that the image data can take to the second corrected data for a pixel whose value of the first quantized data is a maximum value.

11. The image processing apparatus according to claim 1, wherein
the first quantization unit generates N-valued quantized data as the first quantized data and
the second quantization unit generates the second corrected data so that the second quantized data does not become 1 for a pixel whose value of the first quantized data is a minimum value or a maximum value.

12. The image processing apparatus according to claim 1, wherein
the nozzle can print dots of different sizes at (N−1) levels on the printing medium.

13. The image processing apparatus according to claim 12, wherein
the nozzle has a piezo element and prints dots of different sizes at (N−1) levels on the printing medium by causing a pulse shape of a voltage that is applied to the piezo element to differ.

14. The image processing apparatus according to claim 1, wherein
the nozzle can print dots of different densities at (N−1) levels on the printing medium.

15. The image processing apparatus according to claim 1, wherein
the print head is a full line type.

16. The image processing apparatus according to claim 15, wherein
the second correction unit uses a different second correction table for each line in the image data.

17. An image processing method that generates N-valued (N is an integer not less than 3) print data for representing densities at N levels on a printing medium by relatively moving, with respect to a print head in which a plurality of nozzles capable of representing densities at the N levels is arrayed in a predetermined direction, the printing medium in a direction intersecting the predetermined direction, the image processing method comprising:
acquiring multi-valued image data for each pixel;
generating multi-valued first corrected data by correcting the image data by using a first correction table which is made based on a density characteristic of a part of the plurality of nozzles;
generating multi-valued second corrected data by correcting the image data by using a second correction table which is made based on each density characteristic of the plurality of nozzles;
generating first quantized data by quantizing the first corrected data;
generating second quantized data by quantizing the second corrected data; and
generating the N-valued print data based on the first quantized data and the second quantized data.

18. The image processing method according to claim 17, wherein
a position at which the N-valued print data indicates a dot to be printed is a position at which the first quantized data indicates a dot to be printed.

19. A non-transitory computer readable storage medium storing a program for causing a computer to function as each unit of an image processing apparatus that generates N-valued (N is an integer not less than 3) print data for representing densities at N levels on a printing medium by relatively moving, with respect to a print head in which a plurality of nozzles capable of representing densities at the N levels is arrayed in a predetermined direction, the printing medium in a direction intersecting the predetermined direction, the image processing apparatus comprising:
an acquisition unit configured to acquire image data;
a first correction unit configured to generate first corrected data by correcting the image data by using a first correction table which is made based on a density characteristic of a part of the plurality of nozzles;
a second correction unit configured to generate second corrected data by correcting the image data by using a second correction table which is made based on each density characteristic of the plurality of nozzles;
a first quantization unit configured to generate first quantized data by quantizing the first corrected data;
a second quantization unit configured to generate binary second quantized data having a value of 1 or 0 by quantizing the second corrected data; and
a generation unit configured to generate, for a pixel whose value is 1 in the second quantized data, the N-valued print data by correcting a value of the pixel in the first quantized data to a value one value larger.

20. The non-transitory computer readable storage medium storing a program according to claim 19, wherein
a position at which the N-valued print data indicates a dot to be printed is a position at which the first quantized data indicates a dot to be printed.

* * * * *